US011085352B2

(12) United States Patent
Fujii et al.

(10) Patent No.: US 11,085,352 B2
(45) Date of Patent: Aug. 10, 2021

(54) CONSTRUCTION MACHINE (71) Applicant: Hitachi Construction Machinery Co., Ltd., Tokyo (JP)

(72) Inventors: Toshinori Fujii, Tsukuba (JP); Hitoshi Nishiguchi, Tsuchiura (JP); Masaharu Imi, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/642,468

(22) PCT Filed: Jan. 31, 2019

(86) PCT No.: PCT/JP2019/003386
§ 371 (c)(1),
(2) Date: Feb. 27, 2020

(87) PCT Pub. No.: WO2019/181226
PCT Pub. Date: Sep. 26, 2019

(65) Prior Publication Data
US 2020/0256232 A1   Aug. 13, 2020

(30) Foreign Application Priority Data
Mar. 19, 2018   (JP) .............. JP2018-051291

(51) Int. Cl.
*F01N 13/18*   (2010.01)
*F01N 3/20*   (2006.01)
*F01N 3/28*   (2006.01)

(52) U.S. Cl.
CPC .............. *F01N 13/18* (2013.01); *F01N 3/208* (2013.01); *F01N 3/2839* (2013.01);
(Continued)

(58) Field of Classification Search
CPC ............ F01N 13/18; F01N 2610/1426; F01N 2610/1433
See application file for complete search history.

(56) References Cited

U.S. PATENT DOCUMENTS

2013/0000281 A1   1/2013  Merchant et al.
2013/0319550 A1* 12/2013  Maguin .................. F01N 3/208
                                                          137/544
(Continued)

FOREIGN PATENT DOCUMENTS

CN   104948365 A   9/2015
DE   101 39 139 A1   6/2003
(Continued)

OTHER PUBLICATIONS

International Search Report (PCT/ISA/210) issued in PCT Application No. PCT/JP2019/003386 dated Mar. 12, 2019 with English translation (five (5) pages).
(Continued)

*Primary Examiner* — Jonathan R Matthias
(74) *Attorney, Agent, or Firm* — Crowell & Moring LLP (57) ABSTRACT There is provided a urea water supply device (25) that is disposed in a urea water pipe line (23) to supply urea water toward a urea water injection valve (21) from a urea water tank (22). A bracket (24) for attaching the urea water supply device (25) is attached to a revolving frame (5) of an upper revolving structure (3). A cover (31) for covering the urea water supply device (25) is attached to the bracket (24). On top of that, a urea water filter (33) that is disposed in the urea water pipe line (23) and traps foreign objects mixed into the urea water is attached to the cover (31).

1 Claim, 8 Drawing Sheets (52) U.S. Cl.
CPC .. *F01N 2610/02* (2013.01); *F01N 2610/1426* (2013.01); *F01N 2610/1433* (2013.01)

(56) References Cited

U.S. PATENT DOCUMENTS

2016/0222629 A1 * 8/2016 Tsuda .................... E02F 9/0883
2017/0218599 A1    8/2017 Abe

FOREIGN PATENT DOCUMENTS

| GB | 2546111 A * | 7/2017 | ............... F01N 3/20 |
| JP | 2016-94803 A | 5/2016 | |
| JP | 2017-133289 A | 8/2017 | |
| KR | 10-2016-0065862 A | 6/2016 | |
| WO | WO 2007/126366 A1 | 11/2007 | |

OTHER PUBLICATIONS

Japanese-language Written Opinion (PCT/ISA/237) issued in PCT Application No. PCT/JP2019/003386 dated Mar. 12, 2019 (three (3) pages).
Korean-language Office Action issued in Korean Application No. 10-2020-7005672 dated May 10, 2021 (4 pages).

* cited by examiner

CONSTRUCTION MACHINE

TECHNICAL FIELD

The present invention relates to a construction machine such as a hydraulic excavator provided with an exhaust gas purifying device that purifies an exhaust gas in an engine.

BACKGROUND ART

In general, a hydraulic excavator as a construction machine has an automotive vehicle body, an engine disposed on the vehicle body, and an exhaust gas purifying device that purifies an exhaust gas discharged from an engine. In addition, the exhaust gas purifying device is provided with a urea selective reduction catalyst that is connected to an exhaust pipe of the engine to remove nitrogen oxides in the exhaust gas, a urea water injection valve that injects urea water as a reducing agent upstream of the urea selective reduction catalyst, a urea water tank that reserves therein the urea water to be supplied to the urea water injection valve, a urea water pipe line that establishes connection between the urea water tank and the urea water injection valve, a urea water supply device that is disposed in the urea water pipe line to supply the urea water toward the urea water injection valve from the urea water tank, and a urea water filter that is disposed in the urea water pipe line to trap foreign objects mixed into the urea water (Patent Document 1). In Patent Document 1, the urea water tank, the urea water supply device and the urea water filter are integrally assembled.

PRIOR ART DOCUMENT

Patent Document

Patent Document 1: WO 2007/126366 A1

SUMMARY OF THE INVENTION

Incidentally, according to Patent Document 1, the urea water tank, the urea water supply device and the urea water filter are integrally assembled. In this case, many hoses and electrical wires are respectively connected to the urea water tank and the urea water supply device. As a result, the urea water filter is disposed in a state of being hidden in the depth of each hose and each electrical wire, which therefore poses a problem with labors and hours required for a maintenance work such as a replacement work, a cleaning work and an inspection work of an element in the urea water filter.

The present invention is made in view of the foregoing problem in the conventional technology, and an object of the present invention is to provide a construction machine that can easily attach a urea water supply device and a urea water filter to a vehicle body and besides, improve the maintenance performance of the urea water filter.

A construction machine according to the present invention comprises: an automotive vehicle body; an engine disposed on the vehicle body; and an exhaust gas purifying device that purifies an exhaust gas discharged from the engine, wherein the exhaust gas purifying device includes: a urea selective reduction catalyst that is connected to an exhaust pipe of the engine to remove nitrogen oxides in the exhaust gas; a urea water injection valve that injects urea water as a reducing agent upstream side of the urea selective reduction catalyst; a urea water tank that reserves the urea water to be supplied to the urea water injection valve; a urea water pipe line that establishes connection between the urea water tank and the urea water injection valve; a urea water supply device that is disposed in the urea water pipe line to supply the urea water toward the urea water injection valve from the urea water tank; and a urea water filter that is disposed in the urea water pipe line between the urea water tank and the urea water supply device to trap foreign objects mixed into the urea water, characterized in that: the vehicle body is provided with a bracket for attaching the urea water supply device, the bracket is provided with a cover for covering the urea water supply device, and the urea water filter is attached to the cover.

According to the present invention, the urea water supply device and the urea water filter can be easily attached to the vehicle body and besides, the maintenance performance of the urea water filter can be improved.

MODE FOR CARRYING OUT THE INVENTION

Hereinafter, a hydraulic excavator of a crawler type will exemplified as a representative example of a construction machine according to an embodiment of the present invention, and will be in detail explained with the accompanying drawings.

Figure 1:
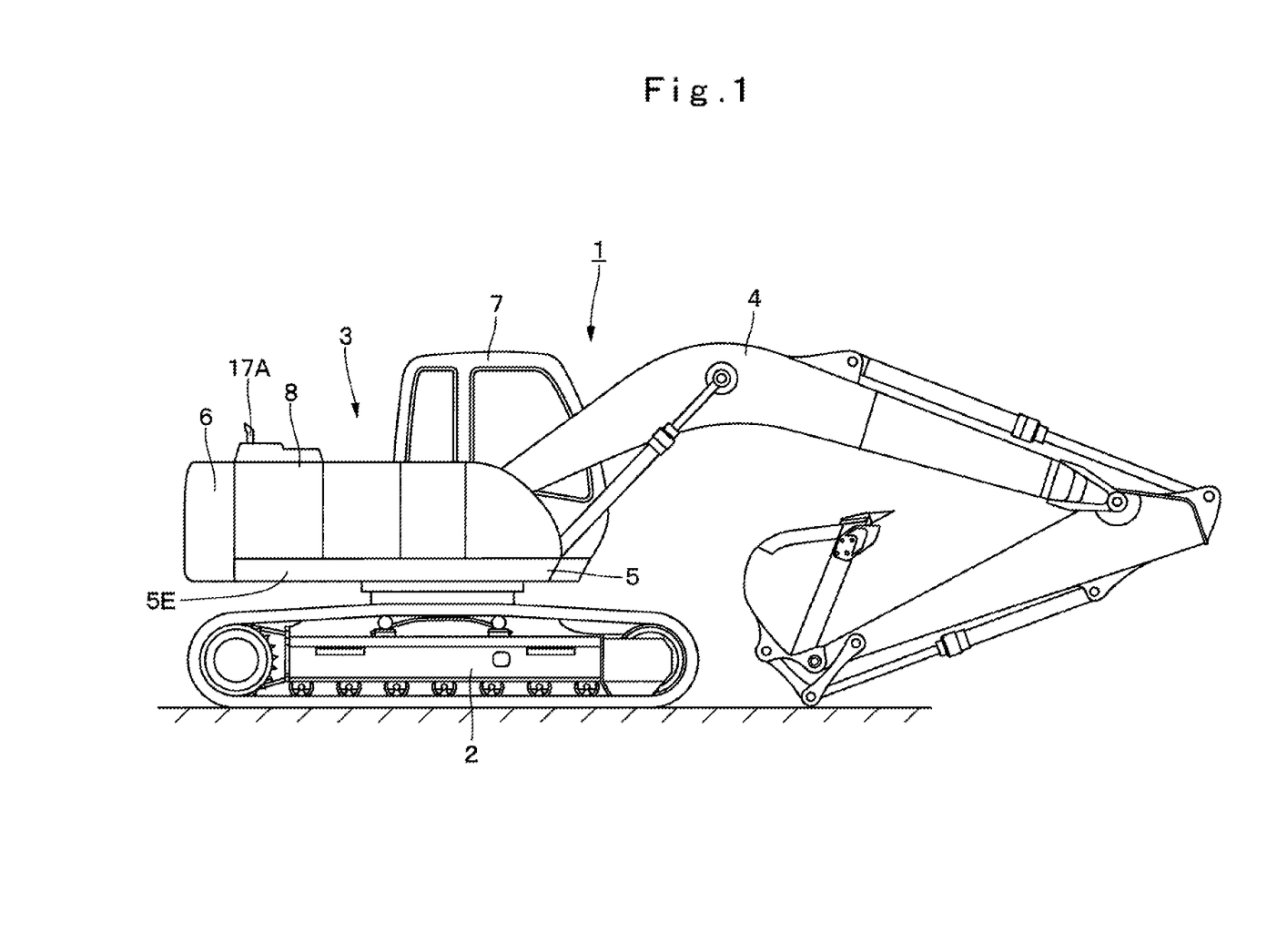
FIG. 1 is a front view showing a hydraulic excavator according to a first embodiment of the present invention.

First, FIG. 1 to FIG. 6 show a first embodiment of the present invention. In FIG. 1, a hydraulic excavator 1 is configured of an automotive lower traveling structure 2 of a crawler type, an upper revolving structure 3 that is mounted on the lower traveling structure 2 to be capable of revolving thereon and configures a vehicle body with the lower traveling structure 2, and a front mechanism 4 that is disposed in the front side of the upper revolving structure 3 to be capable of lifting and tilting thereto and performs an excavating operation of earth and sand or the like.

The upper revolving structure 3 is provided with a revolving frame 5 formed of a support structure, a counterweight 6 that is disposed in back of the revolving frame 5 and acts as a balance weight to the front mechanism 4, a cab 7 that is disposed in the front left side of the revolving frame 5 and in which an operator gets, and a housing cover 8 that is disposed in front of the counterweight 6 and accommodates therein an engine 9, a heat exchanger 11, an exhaust gas purifying device 15, which will be described later, and the like.

Figure 2:
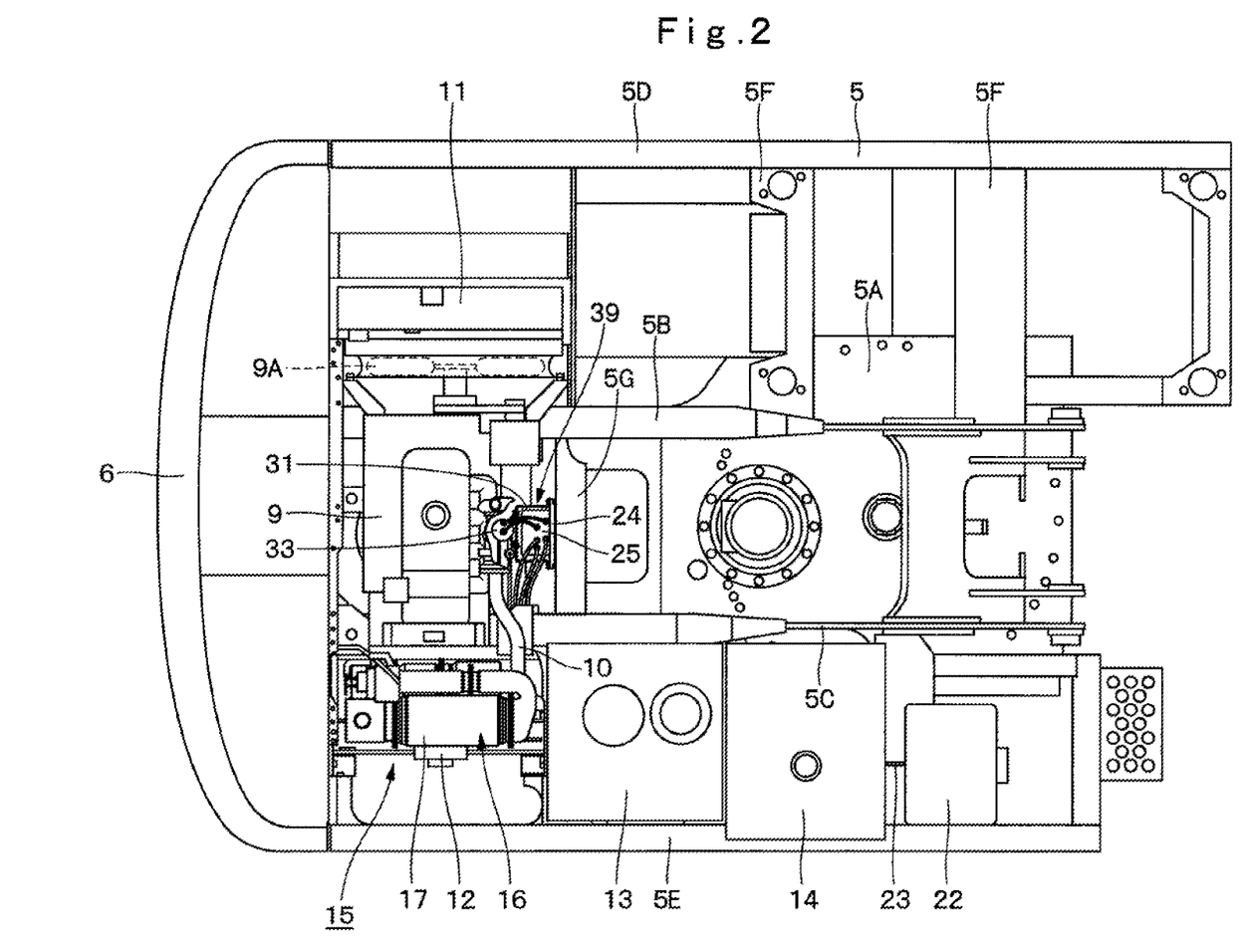
FIG. 2 is a plan view showing an upper revolving structure with a cab, a housing cover and the like removed.

The revolving frame 5, as shown in FIG. 2, includes a bottom plate 5A formed of a thick steel plate extending in a front-rear direction and the like, a left longitudinal plate 5B and a right longitudinal plate 5C that are arranged to rise upward on the bottom plate 5A and extend in the front-rear direction to have a predetermined interval in a right-left direction therebetween, a left side frame 5D and a right side frame 5E that are arranged with intervals in the right-left direction of the respective longitudinal plates 5B, 5C and extend in the front-rear direction, a plurality of extension beams 5F that support the left side frame 5D on a tip portion extending in the left direction from the bottom plate 5A and the left longitudinal plate 5B and support the right side frame 5E on a tip portion extending in the right direction from the right longitudinal plate 5C, and a connecting plate 5G that is positioned in front of the engine 9 to connect the left longitudinal plate 5B and the right longitudinal plate 5C and is disposed to rise upward on the bottom plate 5A. A purifying device assembly 39 to be described later is attached on a rear surface side of the connecting plate 5G.

The engine 9 is positioned in front of the counterweight 6 and is disposed on the revolving frame 5 in a transversely placed state extending in the left-right direction. A cooling fan 9A for supplying cooling air to a heat exchanger 11 to be described later is disposed in the left side to the engine 9. Meanwhile, a hydraulic pump 12 to be described later is disposed in the right side to the engine 9.

Figure 6:
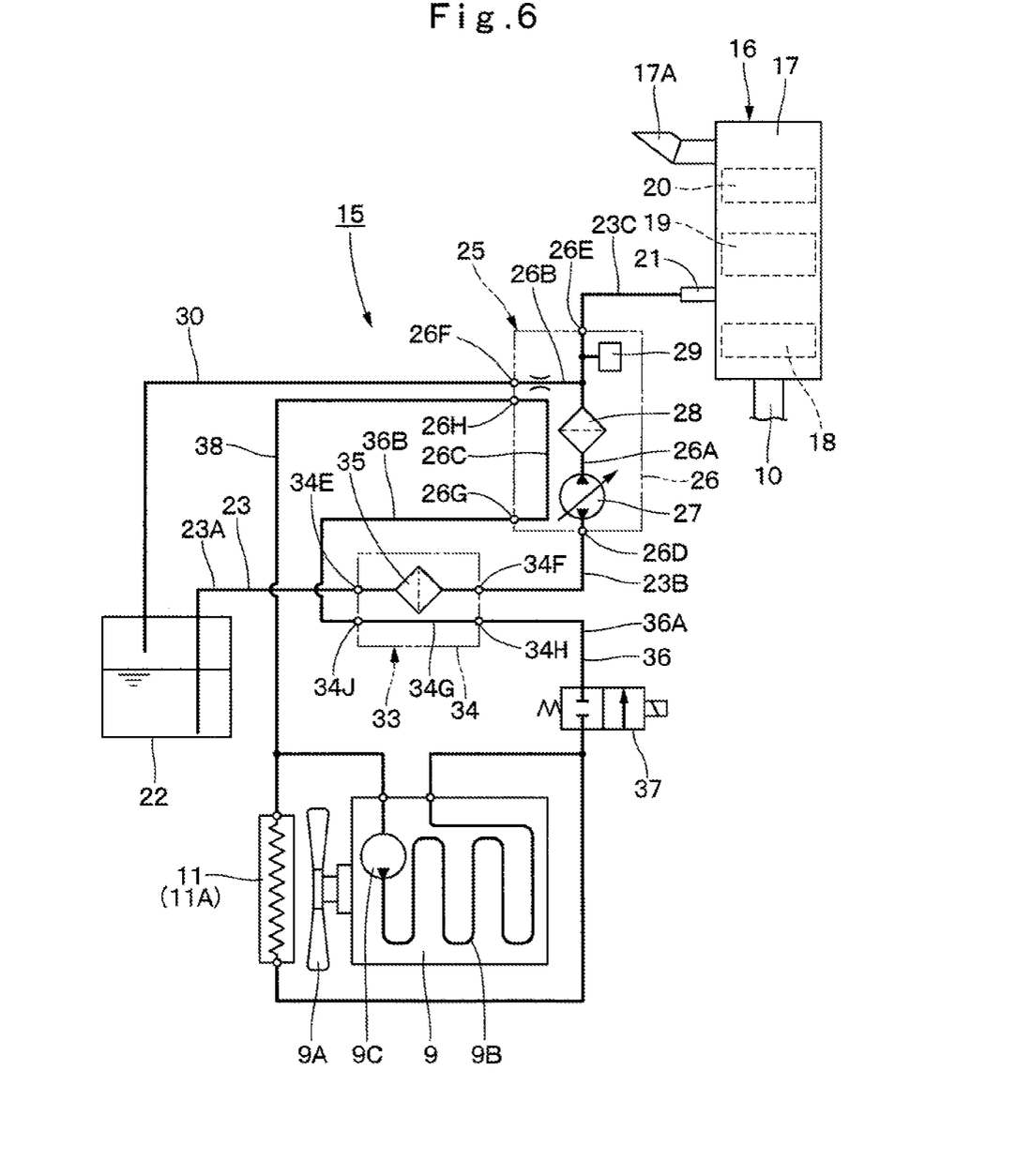
FIG. 6 is a circuit diagram showing an exhaust gas purifying device.

As shown in FIG. 6, a water jacket 9B in which cooling water flows is disposed in the engine 9 for suppressing a temperature rise at the working time. A cooling water pump 9C is disposed in the inflow side of the water jacket 9B to deliver the cooling water. The water jacket 9B is connected to the heat exchanger 11 to be described later. The cooling water circulates between the water jacket 9B and the heat exchanger 11 by a drive of the cooling water pump 9C. A part of the cooling water (heated water), a temperature of which has increased due to cooling the engine 9, is supplied through a cooling water supply passage 36 to be described later to a urea water supply device 25 as well as a urea water filter 33.

Further, an exhaust pipe 10 is connected to the engine 9 to discharge an exhaust gas (refer to FIG. 2). The exhaust pipe 10 is formed as a metallic pipe line extending in the left-right direction at the front side position of the engine 9. The exhaust pipe 10 introduces a high-temperature exhaust gas discharged from the engine 9 to an exhaust gas post-treatment device 16 to be described later.

The heat exchanger 11 is disposed in the left side to the engine 9. The heat exchanger 11 is disposed to face the cooling fan 9A of the engine 9. The heat exchanger 11 is configured of, for example, a radiator 11A that cools cooling water heated through the water jacket 9B of the engine 9, an oil cooler that cools hydraulic oil, an intercooler that cools air to be suctioned by the engine 9 (none of them is not shown), and the like.

The hydraulic pump 12 is disposed to be positioned in the right side to the engine 9. The hydraulic pump 12 is driven by the engine 9. Thereby, the hydraulic pump 12 ejects the hydraulic oil supplied from a hydraulic oil tank 13 to be described later as pressurized oil toward control valve devices (not shown) that control various actuators arranged on the lower traveling structure 2, the front mechanism 4 and the like.

The hydraulic oil tank 13 is disposed in the right side of the revolving frame 5 to be positioned in front of the hydraulic pump 12. The hydraulic oil tank 13 reserves hydraulic oil to drive each actuator. Meanwhile, a fuel tank 14 is disposed on the revolving frame 5 to be positioned in front of the hydraulic oil tank 13.

Next, an explanation will be in detail made of the configuration of the exhaust gas purifying device 15 that is a featuring part of the present embodiment.

The exhaust gas purifying device 15 is configured to purify an exhaust gas discharged from the engine 9, and is disposed above the hydraulic pump 12, for example. The exhaust gas purifying device 15 removes harmful substances contained in the exhaust gas from the engine 9. The exhaust gas purifying device 15 is provided with a muffler mechanism for reducing noises of the exhaust gas. In addition, the exhaust gas purifying device 15 is provided with the exhaust gas post-treatment device 16 having a urea selective reduction catalyst 19 and a urea water injection valve 21, a urea water tank 22, a urea water pipe line 23, the urea water supply device 25 and the urea water filter 33, which will be described later.

The exhaust gas post-treatment device 16 is connected to the outlet side of the exhaust pipe 10. The exhaust gas post-treatment device 16 includes, for example, a cylindrical tubular casing 17 extending in the front-rear direction, a first oxidation catalyst 18 disposed in the tubular casing 17, the urea selective reduction catalyst 19, a second oxidation catalyst 20 and the urea water injection valve 21.

The tubular casing 17 is formed as a closed container both ends of which are closed. The exhaust pipe 10 is connected to a front side part as the upstream side of the tubular casing 17. Meanwhile, a tailpipe 17A is disposed in the tubular casing 17 to be positioned in a rear side part as the downstream side. The first oxidation catalyst 18, the urea selective reduction catalyst 19 and the second oxidation catalyst 20 are arranged in the tubular casing 17 to have intervals in the length direction therebetween. Further, the urea water injection valve 21 is attached to the tubular casing 17 to be positioned between the first oxidation catalyst 18 and the urea selective reduction catalyst 19.

The first oxidation catalyst 18 is formed of a ceramic cellar tubular casing, for example, and has many through holes formed in the axial direction, with an inner surface coated with a noble metal or the like. In addition, the first oxidation catalyst 18 oxidizes carbon monoxide (CO), hydrocarbon (HC) and the like contained in the exhaust gas for removal by causing the exhaust gas to flow through each of the through holes at a predetermined temperature. Further, the first oxidation catalyst 18 burns particulate matter (PM) as well for removal, as needed.

The urea selective reduction catalyst 19 is formed of a ceramic cellar tubular casing, for example, and has many through holes formed in the axial direction, with an inner surface coated with a noble metal. The urea selective reduction catalyst 19 causes nitrogen oxides (NOx) contained in the exhaust gas discharged from the engine 9 to selectively perform a reduction reaction with ammonia generated from a urea water solution, which is decomposed into nitrogen and water.

The second oxidation catalyst 20 is, as similar to the aforementioned first oxidation catalyst 18, formed of a ceramic cellar tubular casing, and has many through holes formed in the axial direction, with an inner surface coated with a noble metal. Thereby, the second oxidation catalyst 20 oxidizes the remaining ammonia left after reducing the nitrogen oxides in the urea selective reduction catalyst 19 to be decomposed into nitrogen and water.

The urea water injection valve 21 is attached to the tubular casing 17 to be positioned between the first oxidation catalyst 18 and the urea selective reduction catalyst 19. The urea water injection valve 21 injects the urea water solution toward the exhaust gas flowing in the tubular casing 17. That is, the urea water injection valve 21 is connected via the urea water pipe line 23 to be described later to the urea water tank 22, and is positioned upstream of the urea selective reduction catalyst 19 to inject the urea water as the reducing agent into the tubular casing 17.

As shown in FIG. 2, the urea water tank 22 is disposed on the revolving frame 5 to be positioned in front of the fuel tank 14 as one example of the installation location. The urea water tank 22 reserves therein the urea water as the reducing agent, and is connected via the urea water pipe line 23 to be described later to the urea water injection valve 21. As shown in FIG. 6, the urea water in the urea water tank 22 flows into the urea water pipe line 23 by the drive of the urea water supply device 25 to be described later and is supplied to the urea water injection valve 21.

The urea water pipe line 23 establishes connection between the urea water tank 22 and the urea water injection valve 21. The urea water pipe line 23 is formed of, for example, a resin hose, a metallic pipe body, or both of a resin hose and metallic pipe body, whereby the urea water reserved in the urea water tank 22 flows toward the urea water injection valve 21.

The urea water supply device 25 and the urea water filter 33, which will be described later, are arranged in the urea water pipe line 23. Therefore, the urea water pipe line 23 is, as shown in FIG. 3 to FIG. 6, configured of a tank-side pipe line part 23A having one end, which is the upstream side at the time of supplying the urea water, connected to the urea water tank 22 and the other end as the downstream side connected to a lower portion of a filter case 34 of the urea water filter 33 to be described later, a supply device-side pipe line part 23B having one end connected to an upper portion of the filter case 34 and the other end connected to the urea water supply device 25, and an injection valve-side pipe line part 23C having one end connected to the urea water supply device 25 and the other end connected to the urea water injection valve 21. Thereby, the other end of the tank-side pipe line part 23A opens to a lower portion of a urea water reserving chamber 34D (refer to FIG. 5), and the one end of the supply device-side pipe line part 23B opens to an upper portion of the urea water reserving chamber 34D. The supply device-side pipe line part 23B can be formed to be short by arranging the urea water supply device 25 and the urea water filter 33 to be close to each other as a part of the purifying device assembly 39.

Here, the urea water filter 33 is arranged upstream of the urea water supply device 25 in the supply direction of the urea water. When the engine 9 becomes in a stopped state, the urea water filter 33 performs an operation of causing the urea water left in the inside of the urea water pipe line 23, the urea water filter 33 and the like to flow backward and to be returned back to the urea water tank 22. Accordingly, the supply device-side pipe line part 23B from the urea water supply device 25 to the urea water tank 22 and the urea water filter 33 are in a state where air and urea water are mixed. Therefore, in a case where the engine 9 restarts, the urea water supply device 25 suctions the urea water from the urea water tank 22, but on this occasion, the urea water supply device 25 suctions the air and the urea water simultaneously. When the air and the urea water are suctioned simultaneously, there occurs possibly a failure in a urea water pump 27 due to the biting of the air (for example, instability of a supply pressure of the urea water or the like).

In this case, in the urea water filter 33, as described later, the urea water and the air can be separated by adjusting the connection position between the tank-side pipe line part 23A and the supply device-side pipe line part 23B. Meanwhile, the separation effect of the urea water and the air in the urea water filter 33 is not exerted over the supply device-side pipe line part 23B.

Therefore, in the present embodiment, as mentioned before, the mixing state of the air and urea water in the supply device-side pipe line part 23B can be suppressed as much as possible by forming the supply device-side pipe line part 23B to be short. As a result, the urea water pump 27 can prevent the failure due to the biting of the air.

Next, an explanation will be made of the configuration of each of a bracket 24, the urea water supply device 25 and the urea water filter 33 that configure featuring parts in the present embodiment, and the structure of attaching the urea water supply device 25 and the urea water filter 33 to the revolving frame 5 using the bracket 24.

As shown in FIG. 2, the bracket 24 is attached on the rear surface of the connecting plate 5G in the revolving frame 5. The bracket 24 attaches the urea water supply device 25 to the connecting plate 5G. The bracket 24 is configured of a laterally long, rectangular supply device attachment plate 24A, an upper attachment plate 24B disposed to be bent in a crank shape on an upper side of the supply device attachment plate 24A, and lower attachment plates 24C disposed to be bent in a crank shape on both ends of a lower side of the supply device attachment plate 24A in the longitudinal direction. The urea water supply device 25 and a cover 31 are attached on the supply device attachment plate 24A of the bracket 24. In addition, the upper attachment plate 24B and each of the lower attachment plates 24C of the bracket 24 are attached on the rear surface of the connecting plate 5G using bolts (not shown).

The urea water supply device 25 is disposed in the urea water pipe line 23, that is, between the supply device-side pipe line part 23B and the injection valve-side pipe line part 23C. The urea water supply device 25 is configured to supply the urea water toward the urea water injection valve 21 from the urea water tank 22. The urea water supply device 25 is configured of a casing 26, a urea water pump 27 (refer to FIG. 6) built in the casing 26, a built-in filter 28 that is built into the casing 26 to be positioned downstream side of the urea water pump 27 at the time of supplying the urea water, and a pressure sensor 29 that is disposed in the casing 26 to be positioned downstream side of the built-in filter 28.

The casing 26 is removably attached on the supply device attachment plate 24A of the bracket 24 using bolts (not shown). The casing 26 is provided with a main passage 26A that communicates the supply device-side pipe line part 23B with the injection valve-side pipe line part 23C in the urea water pipe line 23 via the urea water pump 27 and the built-in filter 28, and a return passage 26B that is positioned downstream side of the built-in filter 28 at the time of supplying the urea water and is branched from the main passage 26A. In addition, the casing 26 is provided with a heater passage 26C to pass near the urea water pump 27 and the built-in filter 28, for example.

Further, a urea water inlet joint 26D as an inlet of the main passage 26A, a urea water outlet joint 26E as an outlet of the main passage 26A, a urea water return joint 26F as an outlet of the return passage 26B, a cooling water inlet joint 26G as an inlet of the heater passage 26C, and a cooling water outlet joint 26H as an outlet of the heater passage 26C are arranged on a top surface of the casing 26.

In addition, the other end of the supply device-side pipe line part 23B forming the urea water pipe line 23 is connected to the urea water inlet joint 26D. One end of the injection valve-side pipe line part 23C is connected to the urea water outlet joint 26E. One end of a urea water return passage 30 for returning the urea water back to the urea water tank 22 is connected to the urea water return joint 26F. In addition, the other end of a second passage 36B in a cooling water supply passage 36 to be described later is connected to the cooling water inlet joint 26G. One end of a cooling water return passage 38 to be described later is connected to the cooling water outlet joint 26H.

The casing 26 is provided with a filter attachment space 26J (refer to FIG. 4) for attaching the built-in filter 28. The filter attachment space 26J is formed to open to the lower side. As a result, the built-in filter 28 can be attached to the filter attachment space 26J from the lower side, and can be removed downward.

The urea water pump 27 is disposed in the upstream side of the main passage 26A at the time of supplying the urea water. The urea water pump 27 is driven by an electric motor (not shown) to pressure-deliver the urea water in the urea water tank 22 through the urea water pipe line 23 to the urea water injection valve 21, for example.

Figure 4:
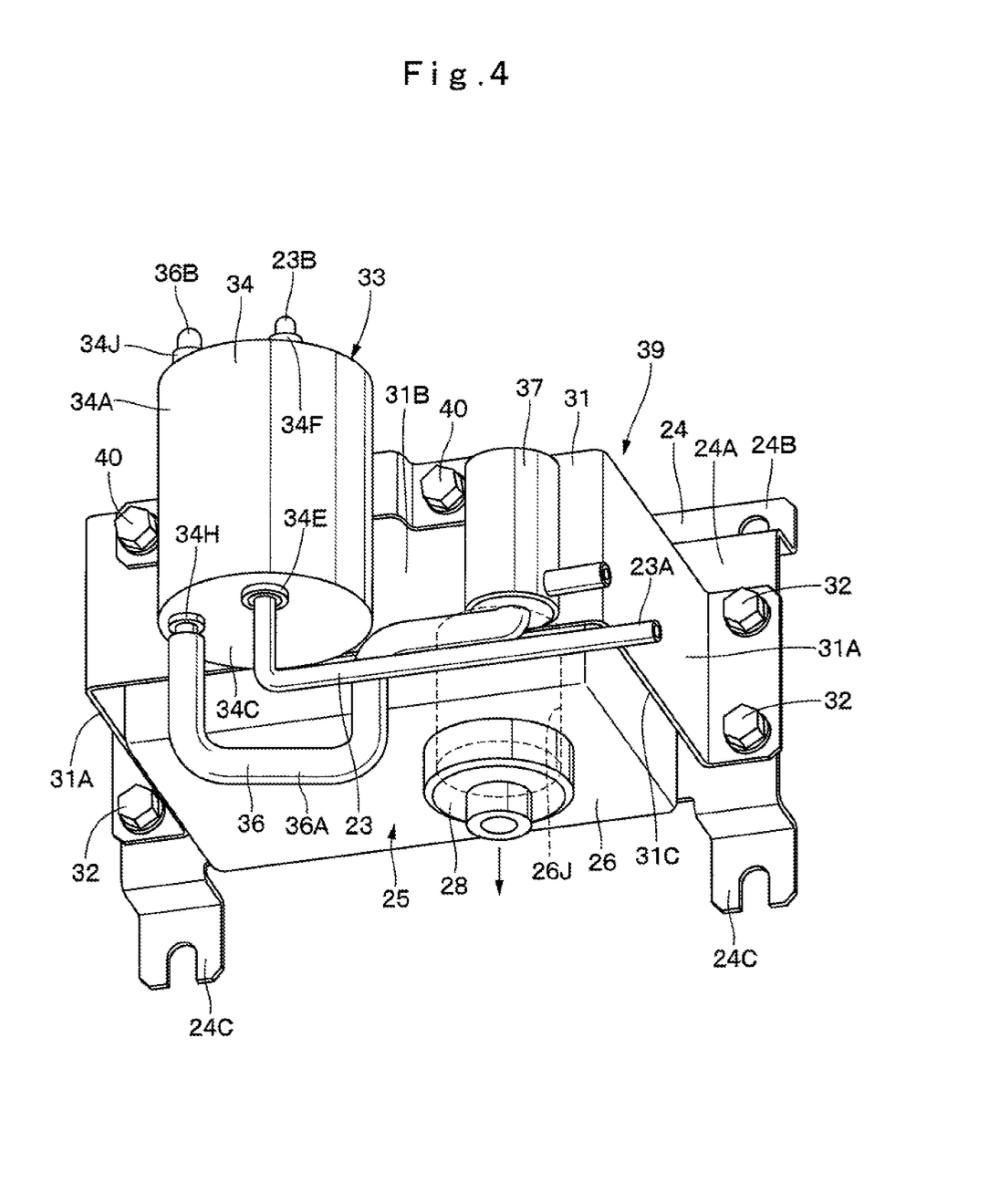
FIG. 4 is an enlarged perspective view showing a state where the bracket, the cover, the urea water supply device, the urea water filter and the like are assembled, as viewed from an oblique lower side.

The built-in filter 28 is disposed in the main passage 26A to be positioned between the urea water pump 27 and a branch point of the return passage 26B. The built-in filter 28 can trap foreign objects mixed into the urea water to be supplied toward the urea water injection valve 21. Here, in a case of attaching the built-in filter 28 to the casing 26, the built-in filter 28 can be attached from the lower side opened to the filter attachment space 26J. Likewise, in a case of removing the built-in filter 28 from the casing 26, the built-in filter 28 can be removed by pulling the built-in filter 28 out of the filter attachment space 26J to the lower side. At this time, since the cover 31 covering the urea water supply device 25 has an opening part 31C opened to the downward, the built-in filter 28 can be easily removed through the opening part 31C.

Figure 3:
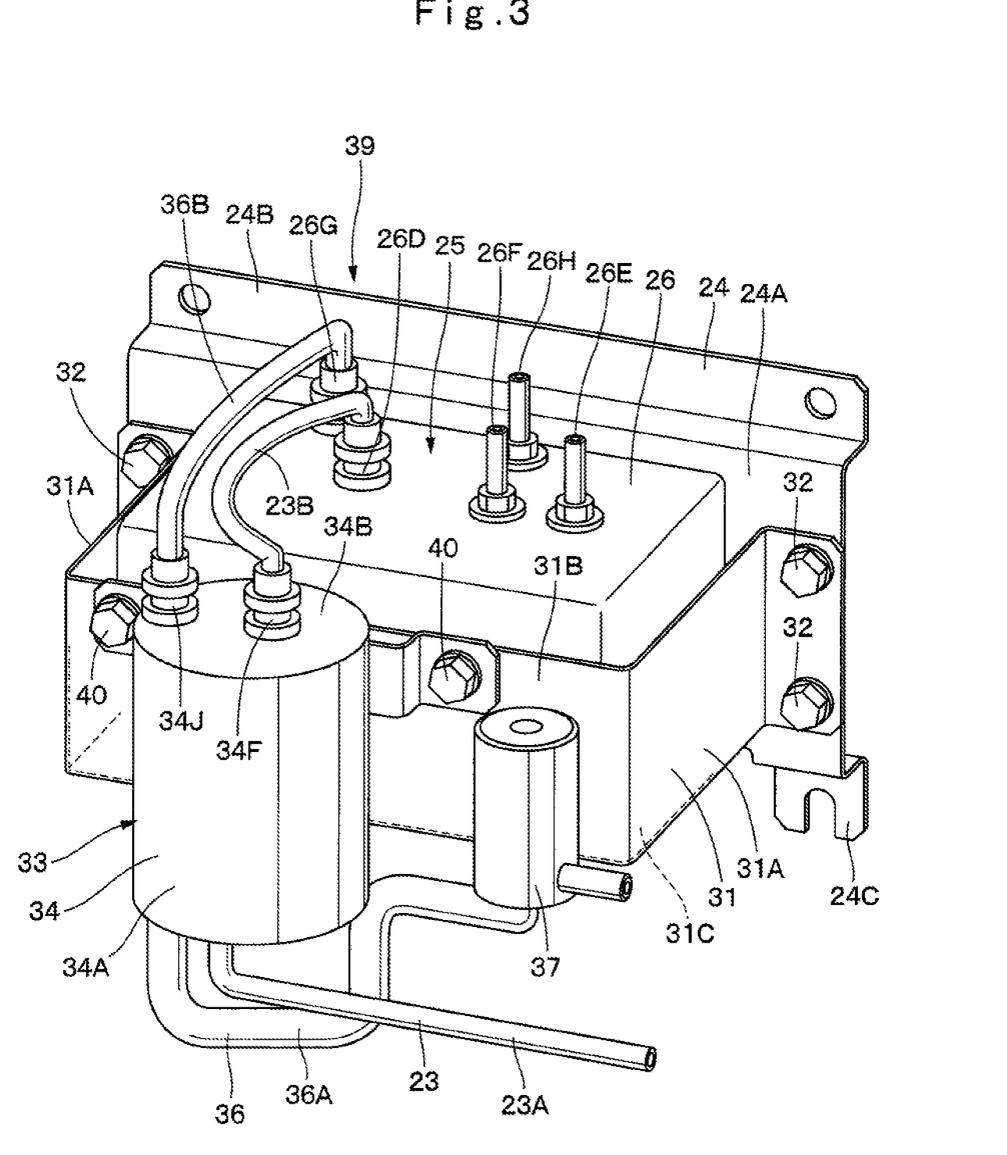
FIG. 3 is an enlarged perspective view showing a state where a bracket, a cover, a urea water supply device, a urea water filter and the like are assembled, as viewed from an oblique upper side.

The cover 31 is attached to the bracket 24 to cover the urea water supply device 25. The cover 31 is configured of a pair of side plates 31A that are arranged in positions across the urea water supply device 25 in a lateral direction and are attached on the supply device attachment plate 24A of the bracket 24 using bolts 32, and a filter attachment plate 31B that is positioned at the opposite side of the bracket 24 across the urea water supply device 25 and is disposed over tip ends of the respective side plates 31A.

Accordingly, the cover 31 covers the periphery of the urea water supply device 25, and an upper side and a lower side of the cover 31 respectively open. By this configuration, as shown in FIG. 4, at the time of removing the built-in filter 28 to the urea water supply device 25, the opening part 31C for causing the built-in filter 28 to pass through is disposed in the lower side of the cover 31. Therefore, the built-in filter 28 can be easily removed through the opening part 31C.

The urea water filter 33 is attached on the filter attachment plate 31B of the cover 31. The urea water filter 33 is disposed in the urea water pipe line 23 between the urea water tank 22 and the urea water supply device 25 to trap the foreign object mixed into the urea water. Here, when two filters of the built-in filter 28 and the urea water filter 33 as mentioned before are arranged in the exhaust gas purifying device 15, it is possible to certainly trap the foreign objects mixed into the urea water.

Figure 5:
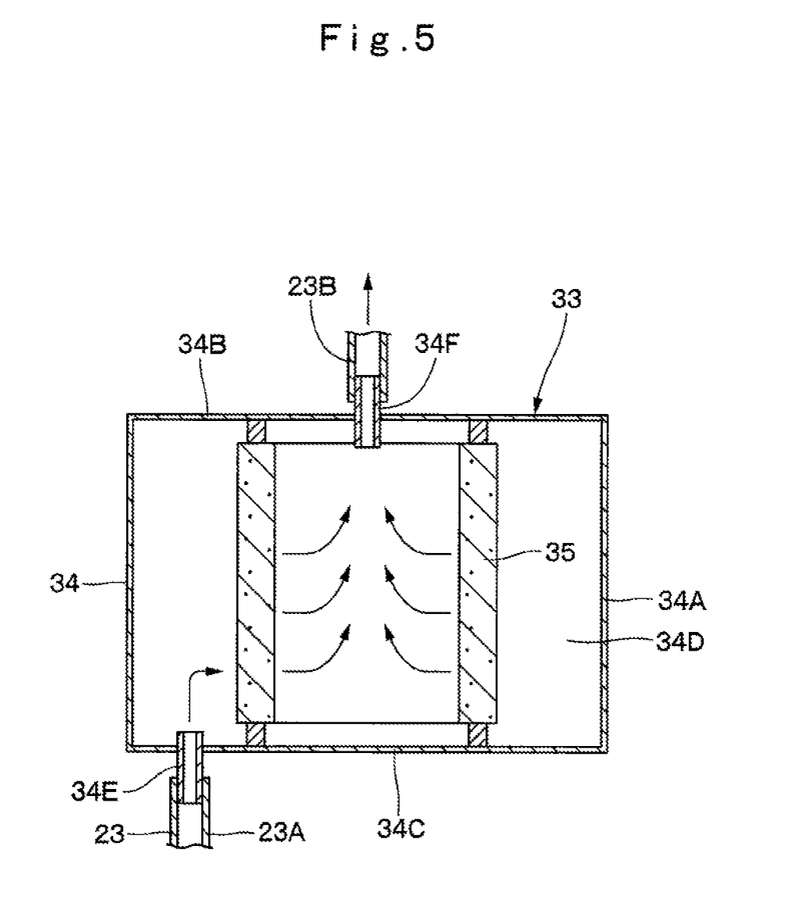
FIG. 5 is across sectional view schematically showing an internal structure of the urea water filter.

As shown in FIG. 5, the urea water filter 33 is configured of, for example, a filter case 34 formed of a cylindrical container, and a filter element 35 that is disposed within the filter case 34 and traps foreign objects mixed into the urea water. Here, the filter case 34 is provided with a circular tubular casing 34A, a top surface plate 34B and a bottom surface plate 34C.

As shown in FIG. 3 and FIG. 4, the filter case 34 is removably attached on the filter attachment plate 31B of the cover 31 using bolts 40. Thereby, the urea water filter 33 can be replaced by loosening the bolts 40.

Here, as shown in FIG. 5, a urea water inlet joint 34E is disposed on the bottom surface plate 34C of the filter case 34 to open in the lower portion of a urea water reserving chamber 34D. In addition, a urea water outlet joint 34F is disposed on the top surface plate 34B of the filter case 34 to open in the upper portion of the urea water reserving chamber 34D. The other end of the tank-side pipe line part 23A configuring the urea water pipe line 23 is connected to the urea water inlet joint 34E. As a result, the other end of the tank-side pipe line part 23A opens to the lower portion of the urea water reserving chamber 34D of the filter case 34. One end of the supply device-side pipe line part 23B configuring the urea water pipe line 23 is connected to the urea water outlet joint 34F. As a result, the one end of the supply device-side pipe line part 23B opens to the upper portion of the urea water reserving chamber 34D.

As shown in FIG. 6, for example, a heater passage 34G is disposed in the filter case 34 to pass near the filter element 35. A cooling water inlet joint 34H is disposed on the bottom surface plate 34C of the filter case 34. A cooling water outlet joint 34J is disposed on the top surface plate 34B of the filter case 34. The other end of a first passage 36A of the cooling water supply passage 36 to be described later is connected to the cooling water inlet joint 34H, and one end of a second passage 36B is connected to the cooling water outlet joint 34J.

The urea water filter 33 as configured in this way causes the urea water from the urea water tank 22 to flow into the urea water reserving chamber 34D from the lower portion of the urea water reserving chamber 34D. In the inflow structure of the urea water, the urea water flows into the urea water reserving chamber 34D in such a manner as not to bite the air in the urea water reserving chamber 34D, and almost all of the air in the urea water reserving chamber 34D is caused to flow out to the supply device-side pipe line part 23B-side. Thereafter, the urea water filter 33 can cause the urea water into which the air is not mixed to flow out to the supply device-side pipe line part 23B-side. In addition, the urea water having flowed into the urea water reserving chamber 34D passes through the filter element 35 to remove foreign objects therefrom for purification. As a result, the urea water filter 33 can cause the purified urea water to flow out to the supply device-side pipe line part 23B-side.

The cooling water supply passage 36 is disposed over the outlet side of the water jacket 9B of the engine 9, the urea water supply device 25 and the urea water filter 33. The cooling water supply passage 36 is configured of the first passage 36A for connection of the outlet side of the water jacket 9B and the cooling water inlet joint 34H of the filter case 34, and the second passage 36B for connection of the cooling water outlet joint 34J and the cooling water inlet joint 26G disposed in the casing 26 of the urea water supply device 25.

A cooling water control valve 37 is attached to the cover 31 to be positioned in the first passage 36A in the cooling water supply passage 36. The cooling water control valve 37 opens in a case where the urea water in the urea water supply device 25 and the urea water filter 33 is frozen or possibly frozen. Thereby, the cooling water control valve 37 supplies the cooling water, which has been heated by cooling the engine 9, to the urea water supply device 25 and the urea water filter 33.

A cooling water return passage 38 can return the cooling water having heated the urea water supply device 25 and the urea water filter 33 back to the water jacket 9B. The cooling water return passage 38 connects the cooling water outlet joint 26H of the casing 26 to the inlet side of the water jacket 9B.

Here, as shown in FIG. 3 and FIG. 4, the purifying device assembly 39 is configured by assembling the bracket 24, the urea water supply device 25, the cover 31, the urea water filter 33 and the cooling water control valve 37 as described before. Since the purifying device assembly 39 can be assembled in a location different from a main assembly line, it is possible to improve the workability at the assembling time.

The hydraulic excavator 1 according to the present embodiment has the configuration as described above, and next, an operation thereof will be explained.

First, an operator gets in the cab 7 and operates the engine 9. In addition, the operator operates the traveling operation lever and pedal (not shown) disposed in the cab 7 to cause the hydraulic excavator 1 to be capable of traveling. Further, the operator operates the working operation lever (not shown) to be capable of performing an excavating operation of earth and sand using the front mechanism 4.

Here, the exhaust gas discharged from the engine 9 at the driving time of the engine 9 is discharged through the exhaust pipe 10 and the exhaust gas post-treatment device 16 to the atmosphere.

In this case, carbon monoxide (CO), hydrocarbon (HC) and the like contained in the exhaust gas are oxidized by the first oxidation catalyst 18 disposed in the exhaust gas post-treatment device 16 for removal. In addition, particulate matter (PM) is burned for removal, as needed. Meanwhile, the urea water is injected to the exhaust gas from the urea water injection valve 21 downstream side of the first oxidation catalyst 18, and therefore, nitrogen oxides are decomposed into nitrogen and water by the urea selective reduction catalyst 19. Further, the second oxidation catalyst 20 oxidizes the remaining ammonia to be decomposed into nitrogen and water, whereby the sufficiently purified exhaust gas can be discharged into the atmosphere.

Next, an explanation will be made of a case of supplying the urea water in the urea water tank 22 to the urea water injection valve 21. The urea water pump 27 in the urea water supply device 25 is driven to suction the urea water in the urea water tank 22 through the urea water pipe line 23. The urea water flowing in the tank-side pipe line part 23A in the urea water pipe line 23 passes through the urea water filter 33, whereby foreign objects are removed by the filter element 35, and in that state the urea water flows out to the supply device-side pipe line part 23B.

Here, the urea water from the tank-side pipe line part 23A flows into the urea water filter 33 from the lower portion of the urea water reserving chamber 34D. Thereby, the urea water can be caused to flow into the urea water reserving chamber 34D in such a manner as not to bite the air in the urea water reserving chamber 34D, and the urea water reserving chamber 34D can be separated into two layers of the urea water and the air in the upper-lower direction. In addition, the urea water having flowed into the urea water reserving chamber 34D passes through the filter element 35 to be purified, and thereafter, flows out to the supply device-side pipe line part 23B.

The supply device-side pipe line part 23B in the urea water pipe line 23 is formed to be short by arranging the urea water supply device 25 and the urea water filter 33 to be close to the purifying device assembly 39 as a part of the purifying device assembly 39. Thereby, it is possible to suppress the mixing state of the air and the urea water in the supply device-side pipe line part 23B as much as possible.

The urea water supplied to the urea water supply device 25 through the supply device-side pipe line part 23B flows into the main passage 26A, and is pressure-delivered from the urea water pump 27. In this case, since the urea water having flowed into the main passage 26A is suppressed from being mixed with the air, it is possible to stably supply the urea water without occurrence of the failure due to the biting of the air.

The urea water pressure-delivered from the urea water pump 27 passes through the built-in filter 28 to remove foreign objects therefrom and be further purified. The purified urea water is supplied through the injection valve-side pipe line part 23C to the urea water injection valve 21. In addition, the urea water that has not been supplied to the urea water injection valve 21 is returned through the return passage 26B and the urea water return passage 30 back to the urea water tank 22.

Thus, according to the present embodiment, there is provided the urea water supply device 25 that is disposed in the urea water pipe line 23 and supplies the urea water from the urea water tank 22 toward the urea water injection valve 21. The bracket 24 is attached to the revolving frame 5 of the upper revolving structure 3 to attach the urea water supply device 25. The cover 31 is attached to the bracket 24 to cover the urea water supply device 25. On top of that, the urea water filter 33 that is disposed in the urea water pipe line 23 and traps foreign object mixed into the urea water is configured to be attached to the cover 31.

Accordingly, the bracket 24, the urea water supply device 25, the cover 31, the urea water filter 33 and the like can be formed as the single purifying device assembly 39. Thereby, the urea water supply device 25 and the urea water filter 33 can be attached to the revolving frame 5 as the purifying device assembly 39. As a result, the urea water supply device 25 and the urea water filter 33 can be easily attached to the revolving frame 5, and besides, the maintenance performance of the urea water filter 33 can be improved.

The urea water filter 33 is provided with the filter case 34 that is configured as the urea water reserving chamber 34D reserving the urea water therein, and the filter element 35 that is disposed in the urea water reserving chamber 34D of the filter case 34 to trap foreign objects mixed into the urea water. The urea water pipe line 23 includes the tank-side pipe line part 23A having one end connected to the urea water tank 22 and the other end connected to the lower portion of the filter case 34, and the supply device-side pipe line part 23B having one end connected to the upper portion of the filter case 34 and the other end connected to the urea water supply device 25.

Accordingly, the urea water from the urea water tank 22 can flow into the urea water reserving chamber 34D from the lower portion of the urea water reserving chamber 34D. That is, since the urea water flows into the urea water reserving chamber 34D from the lower side in such a manner as not to bite the air in the urea water reserving chamber 34D, the air in the urea water reserving chamber 34D is pushed up by the flowing-in urea water to flow out to the supply device-side pipe line part 23B-side. Thereby, the urea water filter 33 causes the air to flow out, and thereafter, can supply the urea water, into which the air is not mixed, to the supply device-side pipe line part 23B-side.

As a result, since it is possible to suppress the mixing state of the air and the urea water in the supply device-side pipe line part 23B-side as much as possible, the failure due to the biting of the air can be suppressed to stably supply the urea water toward the urea water injection valve 21.

The built-in filter 28 that traps foreign objects mixed into the urea water is removably disposed in the urea water supply device 25. On top of that, the opening part 31C is disposed in the lower side of the cover 31 to cause the built-in filter 28 to pass therethrough at the time of removing the built-in filter 28 to the urea water supply device 25. As a result, the built-in filter 28 can be easily removed through the opening part 31C.

Figure 7:
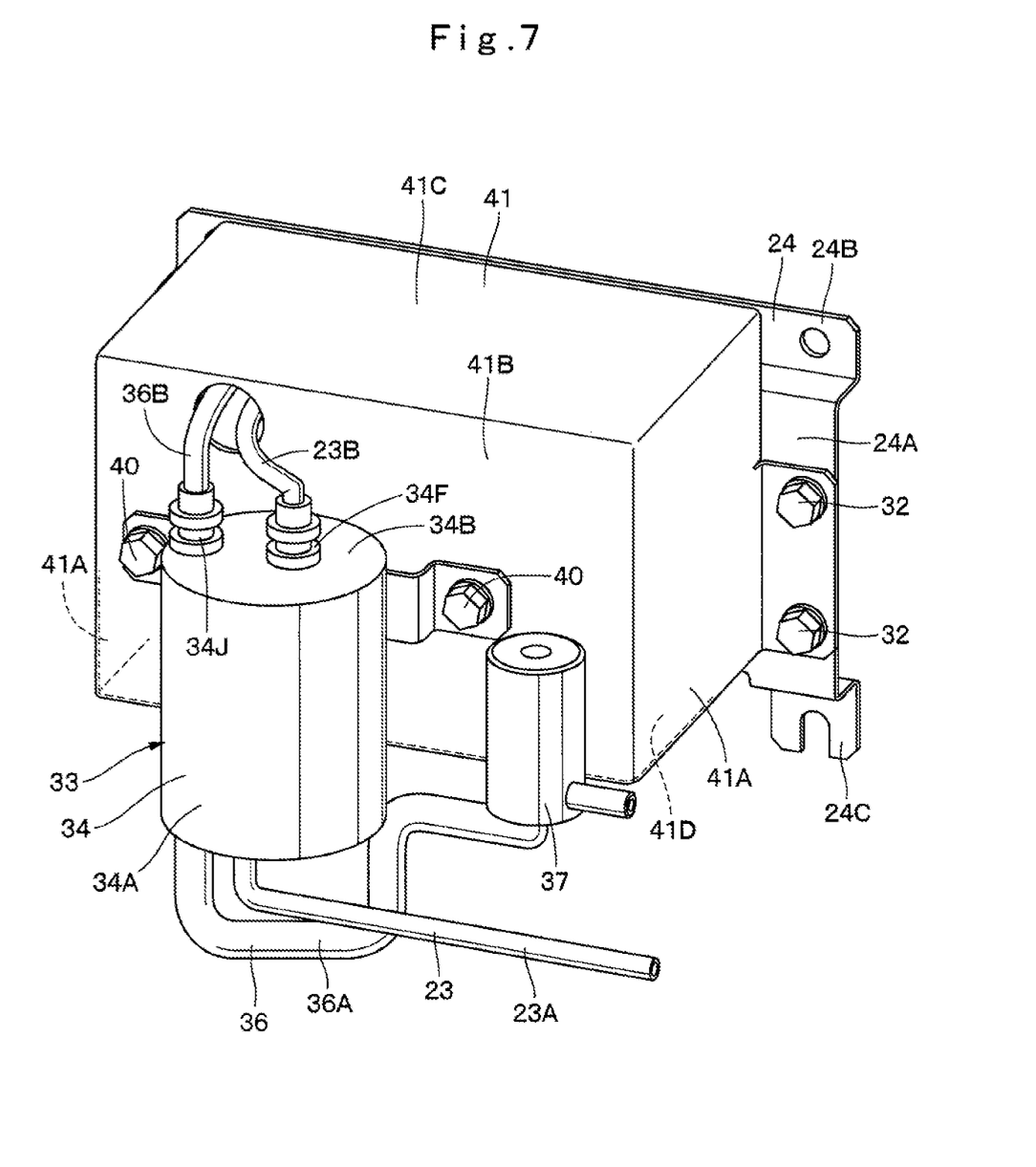
FIG. 7 is a perspective view showing a cover together with a bracket, a urea water filter and the like according to a second embodiment, as viewed from a position as similar to FIG. 3.

Next, FIG. 7 shows a second embodiment of the present invention. The present embodiment is characterized in that a cover is configured to open at only a lower side where an opening part is disposed, in a state of being attached to a bracket. It should be noted that in the present embodiment, components identical to those in the first embodiment as mentioned before are referred to as identical reference numerals, and an explanation thereof is omitted.

In FIG. 7, a cover 41 is attached to the bracket 24 to cover the urea water supply device 25. The cover 41 is configured of a pair of side plates 41A that are arranged respectively in positions across the urea water supply device 25 in a lateral direction and are attached on the supply device attachment plate 24A of the bracket 24 using bolts 32, a filter attachment plate 41B that is positioned at the opposite side of the bracket 24 across the urea water supply device 25 and is disposed over tip ends of the respective side plates 41A, and a top surface plate 41C that is disposed on an upper portion of each of the side plates 41A and the filter attachment plate 41B to cover an upper side of the urea water supply device 25. Thereby, in a state where the cover 41 is attached to the bracket 24, only a lower side, on which an opening part 41D is disposed, of the cover 41 opens.

Thus, also in the second embodiment as configured in this way, an operational effect as substantially similar to that in the first embodiment as mentioned before can be obtained. Particularly, according to the second embodiment, since the cover 41 covers the upper side of the urea water supply device 25 by the top surface plate 41C, it is possible to protect the urea water supply device 25, and hoses and the like connected to the urea water supply device 25.

Figure 8:
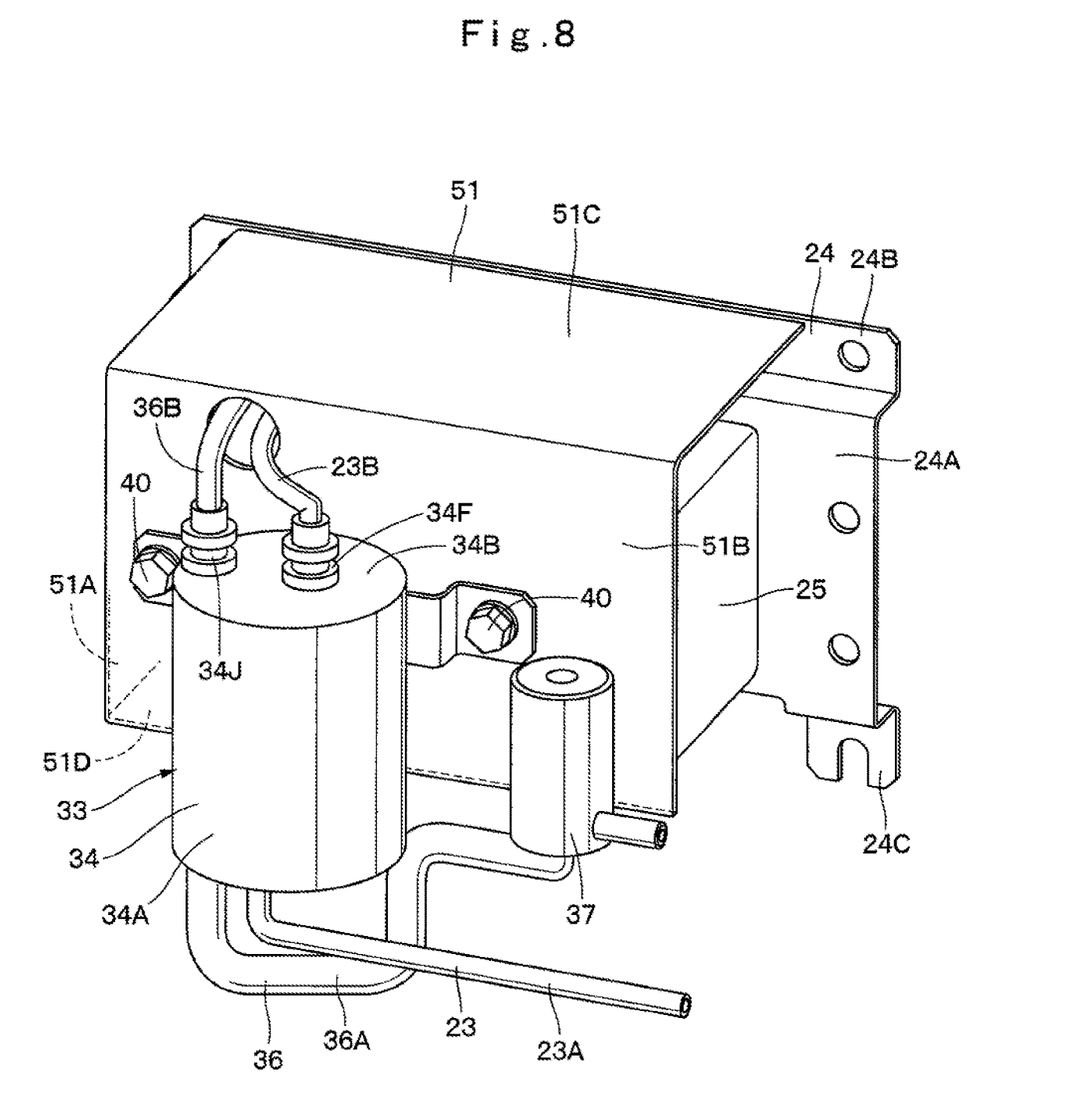
FIG. 8 is a perspective view showing a cover together with a bracket, a urea water supply device, a urea water filter and the like according to a third embodiment, as viewed from a position as similar to FIG. 3.

Next, FIG. 8 shows a third embodiment of the present invention. The present embodiment is characterized in that a cover is configured to open in a lateral side and a lower side. It should be noted that in the present embodiment, components identical to those in the first embodiment as mentioned before are referred to as identical reference numerals, and an explanation thereof is omitted.

In FIG. 8, a cover 51 is attached to the bracket 24 to cover the urea water supply device 25. The cover 51 is configured of a side plate 51A facing one surface of the urea water supply device 25 in a lateral direction, a filter attachment plate 51B that is positioned at the opposite side of the bracket 24 across the urea water supply device 25 and is disposed on a tip end of the side plate 51A, and a top surface plate 51C that is disposed on upper portions of the side plate 51A and the filter attachment plate 51B to cover an upper side of the urea water supply device 25. Thereby, in a state where the cover 51 is attached to the bracket 24, the other side of the cover 51 in a lateral direction and a lower side, on which an opening part 51D is disposed, of the cover 51 open.

Thus, also in the third embodiment as configured in this way, an operational effect as substantially similar to that in the first embodiment as mentioned before can be obtained.

It should be noted that the embodiment is explained by taking a case where the first oxidation catalyst 18, the urea selective reduction catalyst 19 and the second oxidation catalyst 20 are arranged in the tubular casing 17 of the exhaust gas post-treatment device 16, as an example. However, the present invention is not limited thereto, but, for example, a particulate matter removal filter (DPF) may be disposed in a tubular casing of an exhaust gas post-treatment device to be positioned downstream side of a first oxidation catalyst. The particulate matter removal filter traps and burns particulate matter (PM) in an exhaust gas discharged from an engine for removal to purify the exhaust gas.

The embodiment is explained by taking the hydraulic excavator 1 provided with the lower traveling structure 2 of a crawler type as an example of the construction machine. However, the present invention is not limited thereto, but may be applied to a hydraulic excavator provided with a lower traveling structure of a wheel type, for example. Other than that, the present invention may be widely applied to the other-type construction machines such as a hydraulic crane.

DESCRIPTION OF THE REFERENCE NUMERALS

1: Hydraulic excavator (Construction machine)
2: Lower traveling structure (Vehicle body)
3: Upper revolving structure (Vehicle body)
9: Engine
10: Exhaust pipe
15: Exhaust gas purifying device
19: Urea selective reduction catalyst
21: Urea water injection valve
22: Urea water tank
23: Urea water pipe line
23A: Tank-side pipe line part
23B: Supply device-side pipe line part
24: Bracket
25: Urea water supply device
27: Urea water pump
28: Built-in filter
31, 41, 51: Cover
31C, 41D, 51D: Opening part
33: Urea water filter
34: Filter case
34D: Urea water reserving chamber
35: Filter element

The invention claimed is:

1. A construction machine comprising:
an automotive vehicle body;
an engine disposed on the vehicle body; and
an exhaust gas purifying device that purifies an exhaust gas discharged from the engine,
wherein the exhaust gas purifying device includes:
a urea selective reduction catalyst that is connected to an exhaust pipe of the engine to remove nitrogen oxides in the exhaust gas;
a urea water injection valve that injects urea water as a reducing agent in the upstream side of the urea selective reduction catalyst;
a urea water tank that reserves the urea water to be supplied to the urea water injection valve;

a urea water pipe line that establishes connection between the urea water tank and the urea water injection valve;

a urea water supply device that is disposed in the urea water pipe line and provided with a urea water pump to supply the urea water toward the urea water injection valve from the urea water tank; and a urea water filter that is disposed in the urea water pipe line between the urea water tank and the urea water supply device to trap foreign objects mixed into the urea water, wherein the urea water filter includes:

a filter case having a top surface plate and a bottom surface plate, and provided with a urea water reserving chamber reserving the urea water therein; and     a filter element that is disposed in the filter case to trap foreign objects mixed into the urea water, the urea water supply device includes:

a casing, and a built-in filter removably built into the casing, and traps foreign objects mixed into the urea water, the urea water pipe line includes:

a tank-side pipe line part which connects the urea water tank and the urea water filter; and     a supply device-side pipe line part which connects the urea water filter and the urea water supply device, the tank-side pipe line part is connected to the bottom surface plate of the filter case to cause the urea water from the urea water tank to flow into the urea water reserving chamber from the lower portion of the urea water reserving chamber, the supply device-side pipe line part is connected to the top surface plate of the filter case to cause the urea water which passed through the filter elements to flow out toward the urea water supply device, the vehicle body is provided with a bracket for attaching the urea water supply device, the bracket is provided with a cover for covering the urea water supply device, the urea water filter is attached to the cover, and an opening part is disposed in the lower side of the cover to cause the built-in filter to pass through at the time of removing the built-in filter from the casing.

\* \* \* \* \*